United States Patent [19]
Ohta

[11] Patent Number: 6,047,102
[45] Date of Patent: *Apr. 4, 2000

[54] MAGNETIC RECORDING TYPE OF PHOTOGRAPHIC APPARATUS

[75] Inventor: Seiya Ohta, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/961,492

[22] Filed: Oct. 30, 1997

Related U.S. Application Data

[63] Continuation of application No. 08/274,107, Jul. 12, 1994, abandoned, which is a continuation of application No. 07/874,718, Apr. 27, 1992, abandoned.

[30] Foreign Application Priority Data

| Apr. 30, 1991 | [JP] | Japan | 3-098875 |
| May 21, 1991 | [JP] | Japan | 3-116272 |
| Jun. 6, 1991 | [JP] | Japan | 3-134944 |

[51] Int. Cl.[7] .............................. H04N 5/76; H04N 5/225
[52] U.S. Cl. ............................ 386/93; 386/120; 348/220
[58] Field of Search ................................ 386/38, 45, 117, 386/120, 124–125, 93, 9–10; 348/207, 220; H04N 5/76, 5/78, 5/781, 5/782, 5/783, 5/225, 9/79, 5/92, 9/92

[56] References Cited

U.S. PATENT DOCUMENTS

| 4,321,618 | 3/1982 | Hirose et al. | 396/9 |
| 4,746,949 | 5/1988 | Takei et al. | 354/429 |
| 4,780,766 | 10/1988 | Nutting | 358/228 |
| 4,903,136 | 2/1990 | Iketani | 358/228 |
| 4,918,538 | 4/1990 | Saito et al. | 358/335 |
| 5,202,798 | 4/1993 | Takei et al. | 358/906 |

FOREIGN PATENT DOCUMENTS

| 0405491 | 1/1991 | European Pat. Off. |
| 63-302687 | 9/1988 | Japan |

OTHER PUBLICATIONS

H. Komuro, et al., "New Autofocus Function Improves Picture Quality and Operability of Camcorder", JEE Journal Of Electronic Engineering, vol. 23, No. 231, Mar. 1986, pp. 50–53.

Primary Examiner—Thai Tran
Attorney, Agent, or Firm—Robin, Blecker & Daley

[57] ABSTRACT

A magnetic recording type of photographic apparatus comprises an iris for controlling the amount of light incident from a subject, an image sensor for converting a light signal obtained through the iris into an electrical signal, a converting circuit for converting a video signal supplied from the image sensor into a standard television signal, a motion-image signal processing circuit for applying signal processing to the standard television signal and forming a motion-image signal, a still-image signal processing circuit for applying signal processing to the standard television signal and forming a still-image signal, a recording circuit for recording the still-image signal in a still-image recording area of a video track formed obliquely with respect to a longitudinal axis of a magnetic tape, and for recording the motion-image signal in a motion-image recording area of the video track, an integrating circuit for integrating a video luminance signal supplied from the converting circuit, an arithmetic circuit for calculating a difference between the video luminance signal from the integrating circuit and a reference value, an iris controlling circuit for controlling the iris in accordance with the difference calculated by the arithmetic circuit, and a gain setting circuit for setting a gain of the arithmetic circuit to a higher gain when a still image is to be photographed than when a motion image is to be photographed.

6 Claims, 15 Drawing Sheets

MAGNETIC RECORDING TYPE OF PHOTOGRAPHIC APPARATUS

This is a continuation application under 37 CFR 1.62 of prior application Ser. No. 08/274,107, filed Jul. 12, 1994, abandoned, which is a continuation of Ser. No. 07/874,718, filed Apr. 27, 1992, abandoned.

BACKGROUND OF THE INVENTION

1. Field of the Invention

The present invention relates to a magnetic recording type of photographic apparatus capable of effecting motion-image recording and still-image recording.

2. Description of the Related Art

In the field of magnetic recording, a demand for high-density recording has recently been increasing. To meet such a demand, there is provided, for example, a video tape recorder (VTR) of the type which is capable of effecting magnetic recording of high density by transporting a magnetic tape at a reduced speed. However, a VTR provided with a fixed head for recording an audio signal has the disadvantage that if an audio signal is recorded while simply transporting a magnetic tape at a reduced speed, no large relative speed is obtained and the quality of reproduced sound is degraded. For this reason, a method has been adopted in which the length of each track scanned by a rotary head is extended with respect to the track length used in the conventional art and an audio signal which is compressed along its time axis is sequentially recorded in the additional portion of each extended track.

By way of example, such a method will be explained with reference to a VTR of the rotary 2-head helical scan type. As shown in FIG. 1, a magnetic tape 1 is wrapped around a rotary cylinder 2 through an angle of (180+θ) degrees or more and, as shown in FIG. 2, a video signal recording area 5 and a PCM audio signal recording area 6 are traced by a rotary head 3 or 4 during the rotation of the rotary cylinder 2 through 180 degrees and during the rotation of the same through θ degrees, respectively. A PCM audio signal which is compressed along its time axis is recorded in the PCM audio signal recording area 6.

A method of recording a still image in a digital signal recording area has been proposed as an applied example of the aforesaid method of recording a digital signal in one area while recording a video signal in another area. Since the amount of information carried by a still image is comparatively small, it is possible to record the entire still-image information in the PCM audio signal recording area 6 on the magnetic tape 1 by scanning a number of PCM audio signal recording areas 6. According to this method, not only is it possible to realize still-image photography utilizing a photographic apparatus and a recording medium which are identical to those used for motion-image photography, but it is also possible to provide a high-quality still image. The quality of this still image is higher than that of a still image obtainable by repeatedly reproducing a video signal from the same track on a magnetic tape in a VTR while keeping the magnetic tape in a temporarily stopped state.

In such a magnetic recording type of photographic apparatus capable of recording a motion image and a still image, it is possible to perform automatic exposure control similar to that of a conventional camera for motion-image photography.

One example of automatic exposure control used in the conventional camera for motion-image photography will be described below with reference to FIG. 3. FIG. 3 shows an example of a camera for motion-image photography capable of performing automatic exposure control based solely on an automatic iris control.

Light which has passed through an optical system 601 is conducted to an exposure adjustment mechanism (iris) 602, and the amount of the light is adjusted by the iris 602. The light is then made incident on an image sensor 603 such as a CCD and is converted into an electrical signal by the image sensor 603. The electrical signal from the image sensor 603 is subjected to processing such as gamma correction and separated into a luminance signal and a chrominance signal, by a camera signal processing circuit 604. The luminance and chrominance signals are converted into a standardized television video signal which conforms to, for example, the NTSC system, by a camera encoder 605.

In the meantime, a luminance signal Y which has not been subjected to gamma correction in the camera signal processing circuit 604 is supplied to an integrator 606, where the luminance signal Y is subjected to integration processing. An arithmetic device 607 calculates the difference between the output of the integrator 606 and a reference value to generate a difference signal. The arithmetic device 607 supplies the difference signal to a driver 609 as an exposure control signal. The driver 609 causes the actuator 610 to control the aperture size of the iris 602 on the basis of the exposure control signal, thereby keeping constant the relationship between the output of the integrator 606 and the predetermined reference value.

Another example of automatic exposure control used in the conventional camera for motion-image photography will be described below with reference to FIG. 4. FIG. 4 shows an example of a camera for motion-image photography capable of performing automatic exposure control based on an automatic iris and automatic level control.

Light from a subject passes through a lens 702 and an iris 703 and is made incident on an image sensor 704, where the incident light is converted into an electrical signal. The iris 703 is controlled by the automatic iris circuit 705 on the basis of the electrical signal from the image sensor 704. In the meantime, the signal from the image sensor 704 is supplied to a voltage-controlled amplifier (VCA) 706, where the level of the signal is controlled. An automatic gain control (AGC) circuit which is a constituent element of the VCA 706 is controlled by an AGC control circuit 707 in accordance with the output of the VCA 706. A signal processing circuit 708 separates the output signal of the VCA 706 into a chrominance signal and a luminance signal and performs predetermined processing to output a standard video signal (according to the NTSC or PAL system).

Such a camera for motion-image photography is required to complete automatic exposure control in a short time since the state of a subject to be photographed varies temporally continuously during motion-image photography. However, if the speed of the automatic exposure control is excessively fast, the amount of exposure may exceed a desired amount exposure or an exposure control operation may be repetitively performed. As a result, the photographed subject may be reproduced as a continuous image of insufficient image quality. For this reason, it is desirable that the automatic exposure control be performed with smoothness rather than at a high speed.

On the other hand, still-image photography is achieved by freezing instantaneously the motion of a subject to be photographed. Accordingly, to prevent a shutter opportunity from being missed, high-speed automatic exposure and rapid control free from error are desired. As a result, if automatic exposure control similar to that used for the motion-image photography is performed during the still-image photography, no good exposure is achieved.

In the magnetic recording type of photographic apparatus as shown in FIG. 1, it is possible to utilize AF control similar to that of a motion-image photographic apparatus. Since the state of a subject to be photographed varies temporally continuously during motion-image photography, it is desired that the focusing time required for AF in the motion-image photographic apparatus be made short. However, if an object other than a subject being photographed passes across the scene, excessively fast AF will respond to the object abnormally sensitively, and the photographed subject may be reproduced as a continuous image of insufficient image quality. For this reason, it is desirable to take account of smoothness rather than high-speed response with respect to the performance of AF.

A so-called hill climbing system is known as one automatic focus adjusting method to meet the above-described demand. In the hill climbing system, a high-frequency component is extracted from a video signal obtained from an image sensor and a photographic lens is moved for focusing purpose until the level of the high-frequency component reaches its maximum.

An automatic focus adjusting method utilizing the above-described hill climbing system in the motion-image photographic apparatus shown in FIG. 5 will be described below.

Light passes sequentially through an F lens 101 for focus adjustment, a V lens 102 for magnification variation, a C lens 103 for effecting correction to hold a focus plane, an iris 104 and an RR lens 105 for correctly focusing the light on an image sensing plane. The light is focused on the image sensing plane of an image sensor 106 and converted into an electrical signal. The video signal outputted from the image sensor 106 is amplified to a predetermined level by a preamplifier 107, and is then converted into a standard television signal through predetermined processing such as gamma correction, blanking processing and addition of a sync signal, by a camera signal processing circuit 108.

The image sensor 106 is made to wobble along the optical axis to a slight extent in a predetermined cycle in synchronism with a timing signal generated from a timing generating circuit 114, and the image sensing plane is cyclically vibrated back and forth. A variation which occurs in the state of focus in accordance with the vibration is formed into a modulating signal and the sensed-image signal is modulated.

The video signal from the preamplifier 107 is also supplied to a band-pass filter (BPF) 109, where a high-frequency component which varies with the state of focus is extracted from the video signal. Then, in a gate circuit 110, only a signal portion corresponding to a focus detecting area (ranging frame) which is defined in a part of a viewfinder screen is extracted from the high-frequency component. Then, a peak value appearing during a frame period is detected by a peak detecting circuit 111, and the detected peak value is envelope-detected by a sync detecting circuit 112 in synchronism with a timing signal generated from the timing generating circuit 114. Since the image sensor 106 is made to wobble back and forth along the optical axis as described above, signals AN, AF and AM are applied to the peak detecting circuit 111 in response to the wobbling of the image sensor 106. The signals AN and AF appear on a near side and a far side, respectively, and are in reverse phase with each other, and the signal AM has an amplitude which reaches a minimum at an in-focus point. The signals are sync-detected by the sync detecting circuit 112 on the basis of the same frequency as the frequency of the wobbling, and an output B is obtained as shown in FIG. 6(b). As shown, the output B has a waveform whose signs on the respective near and far sides are reverse to each other and which crosses zero at the in-focus point.

FIG. 6(a) shows an output A obtained by plotting peak levels which are detected by the peak detecting circuit 111 as a lens is moved between a near point and a far point through the in-focus point. FIG. 6(b) shows the corresponding variation of the output B of the sync detecting circuit 112. The output A exhibits a hill-shaped characteristic curve which reaches a maximum at the in-focus point and becomes smaller toward each of the far and near sides.

The signal outputted from the sync detecting circuit 112 is appropriately amplified by an amplifier 113, and is then applied to a focusing-motor driving circuit 116. The focusing-motor driving circuit 116 determines whether the state of focus is near focus or far focus, and the F lens 101 is driven to move up to an in-focus point at a speed according to the envelope detection output. Then, a specific loop gain is set for the output of the sync detecting circuit 112 by the amplifier 113, and the focusing motor 117 is driven by the focusing-motor driving circuit 116 in accordance with the signal outputted from the amplifier 113, whereby the focus of the F lens 101 is adjusted.

However, a number of problems take place if the above-described automatic focus adjusting system is applied to the above-described magnetic recording type of photographic apparatus capable of recording a video signal in the recording area 5 and a digital still image signal in the recording area 6. For example, during still-image photography, it may take a long time to focus a subject to be photographed, or since hunting occurs during focusing, the subject may not be frozen instantaneously. As a result, a shutter opportunity will be missed.

The still-image photography in the above-described apparatus is achieved by freezing instantaneously a subject to be photographed. Accordingly, to prevent a shutter opportunity from being missed, a high-speed magnification varying operation is required and it is desired that an in-focus position be rapidly reached without error.

On the other hand, during the motion-image photography, the state of a subject to be photographed varies temporally continuously and it is, therefore, desired to reduce the time required to reach a target point during magnification adjustment. However, excessively fast adjustment may lead to the problem of exceeding the position of a desired focal length and hence the adjustment operation may be repetitively performed. As a result, the photographed subject may be reproduced as a continuous image of insufficient image quality. For this reason, it is desirable to take account of smoothness rather than high-speed response with respect to the performance of the magnification varying operation.

As is apparent from the above description, still-image photography and motion-image photography differ from each other with regard to the required nature of the magnification varying operation. If an identical magnification varying operation is carried out during each of the still-image photography and the motion-image photography, the problem that no appropriate adjustment of focal length is achieved will also take place.

SUMMARY OF THE INVENTION

It is, therefore, an object of the present invention to solve the problem that if still-image photography and motion-image photography are to be implemented by means of a single photographic arrangement, desired operational characteristics differ for the respective still-image and motion-image photographic modes, and to provide a photographic apparatus capable of optimumly effecting not only still-image photography but also motion-image photography by means of a single photographic arrangement.

To achieve the above object as well as optimum control over the amount of exposure, according to a first aspect of the present invention, there is provided a magnetic recording type of photographic apparatus which comprises an iris for controlling the amount of light incident from a subject, image sensing means for converting a light signal obtained through the iris into an electrical signal, converting means for converting a video signal supplied from the image sensing means into a standard television signal, motion-image signal processing means for applying signal processing to the standard television signal provided by the converting means and forming a motion-image signal, still-image signal processing means for applying signal processing to the standard television signal provided by the converting means and forming a still-image signal, recording means for recording the still-image signal supplied from the still-image signal processing means in a still-image recording area of a video track formed obliquely with respect to a longitudinal axis of a magnetic tape, and for recording the motion-image signal supplied from the motion-image signal processing means in a motion-image recording area of the video track, integrating means for integrating a video luminance signal supplied from the converting means, arithmetic means for calculating a difference between the video luminance signal from the integrating means and a reference value, iris controlling means for controlling the iris in accordance with the difference calculated by the arithmetic means, and gain setting means for setting a gain of the arithmetic means to a higher gain when a still image is to be photographed than when a motion image is to be photographed.

To achieve the above object as well as the optimum control over the amount of exposure, according to a second aspect of the present invention, there is provided a magnetic recording type of photographic apparatus which comprises an iris for controlling the amount of light incident from a subject, image sensing means for converting a light signal obtained through the iris into an electrical signal, converting means for converting a video signal supplied from the image sensing means into a standard television signal, motion-image signal processing means for applying signal processing to the standard television signal provided by the converting means and forming a motion-image signal, still-image signal processing means for applying signal processing to the standard television signal provided by the converting means and forming a still-image signal, recording means for recording the still-image signal supplied from the still-image signal processing means in a still-image recording area of a video track formed obliquely with respect to a longitudinal axis of a magnetic tape, and for recording the motion-image signal supplied from the motion-image signal processing means in a motion-image recording area of the video track, automatic iris controlling means for automatically controlling the iris in accordance with a level of the video signal supplied from the image sensing means, automatic level controlling means for automatically controlling a level of a video signal supplied from the image sensing means but not converted into the standard television signal, and gain setting means for setting a gain of the automatic level controlling means to a higher gain when a still image is to be photographed than when a motion image is to be photographed.

In the first aspect of the present invention, the gain setting means sets the gain of the arithmetic means to a higher gain when a still image is to be photographed than when a motion image is to be photographed, and a video luminance signal from the converting means is integrated by the integrating means. The arithmetic means calculates the difference between the video luminance signal supplied from the integrating means and the reference value, and the iris controlling means controls the iris in accordance with the difference calculated by the arithmetic means.

In the second aspect of the present invention, the automatic iris controlling means automatically controls the iris in accordance with the level of the video signal supplied from the image sensing means, the gain setting means sets the gain of the automatic level controlling means to a higher gain when a still image is to be photographed than when a motion image is to be photographed, and the automatic level controlling means automatically controls the level of the video signal supplied from the image sensing means but not converted into the standard television signal.

To achieve the above object as well as optimum AF control, in accordance with a third aspect of the present invention, there is provided a magnetic recording type of photographic apparatus which comprises an image sensor, converting means for converting a video signal supplied from the image sensor into a standard television signal, motion-image signal processing means for applying signal processing to the standard television signal provided by the converting means and forming a motion-image signal, still-image signal processing means for applying signal processing to the standard television signal provided by the converting means and forming a still-image signal, recording means for recording the still-image signal supplied from the still-image signal processing means in a still-image recording area of a video track formed obliquely with respect to a longitudinal axis of a magnetic tape, and for recording the motion-image signal supplied from the motion-image signal processing means in a motion-image recording area of the video track, wobbling means for causing the image sensor to wobble along an optical axis, controlling means for making a wobbling frequency of the wobbling means higher by a predetermined frequency for still-image photography than for motion-image photography, extracting means for extracting a high-frequency component of the video signal supplied from the image sensor which is being made to wobble by the wobbling means, peak detecting means for detecting a peak during a frame period of the high-frequency component extracted by the extracting means, detecting means for detecting a deviation from an in-focus point on the basis of the peak detected by the peak detecting means, and driving means for driving a focusing lens on the basis of the deviation detected by the detecting means.

In the third aspect of the present invention, the controlling means makes the wobbling frequency of the wobbling means higher by a predetermined frequency for still-image photography than for motion-image photography, and the wobbling means causes the image sensor to wobble along the optical axis thereof. The extracting means extracts a high-frequency component of the video signal supplied from the image sensor which is being made to wobble by the wobbling means, and the peak detecting means detects a peak during the frame period of the high-frequency component extracted by the extracting means. The detecting means detects a deviation from an in-focus point on the basis of the peak detected by the peak detecting means, and the driving means drives a focusing lens on the basis of the deviation detected by the detecting means.

Further, to achieve the above-described object as well as to enable both an optimum magnification varying operation and optimum adjustment of focal length, in accordance with a fourth aspect of the present invention, there is provided a magnetic recording type of photographic apparatus which comprises an image sensor, converting means for converting a video signal supplied from the image sensor into a standard television signal, motion-image signal processing means for applying signal processing to the standard television signal provided by the converting means and forming a motion-image signal, still-image signal processing means for applying signal processing to the standard television signal provided by the converting means and forming a still-image signal, recording means for recording the still-image signal supplied from the still-image signal processing means in a still-image recording area of a video track formed obliquely with respect to a longitudinal axis of a magnetic tape, and for recording the motion-image signal supplied from the motion-image signal processing means in a motion-image recording area of the video track, focal length adjusting means for adjusting a focal length, and driving controlling means for driving the focal length adjusting means with smoothness during motion-image photography and at a high speed during still-image photography.

In the fourth aspect of the present invention, the focal length adjusting means for adjusting a focal length is driven with smoothness during motion-image photography and at a high speed during still-image photography, by the driving controlling means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 7:
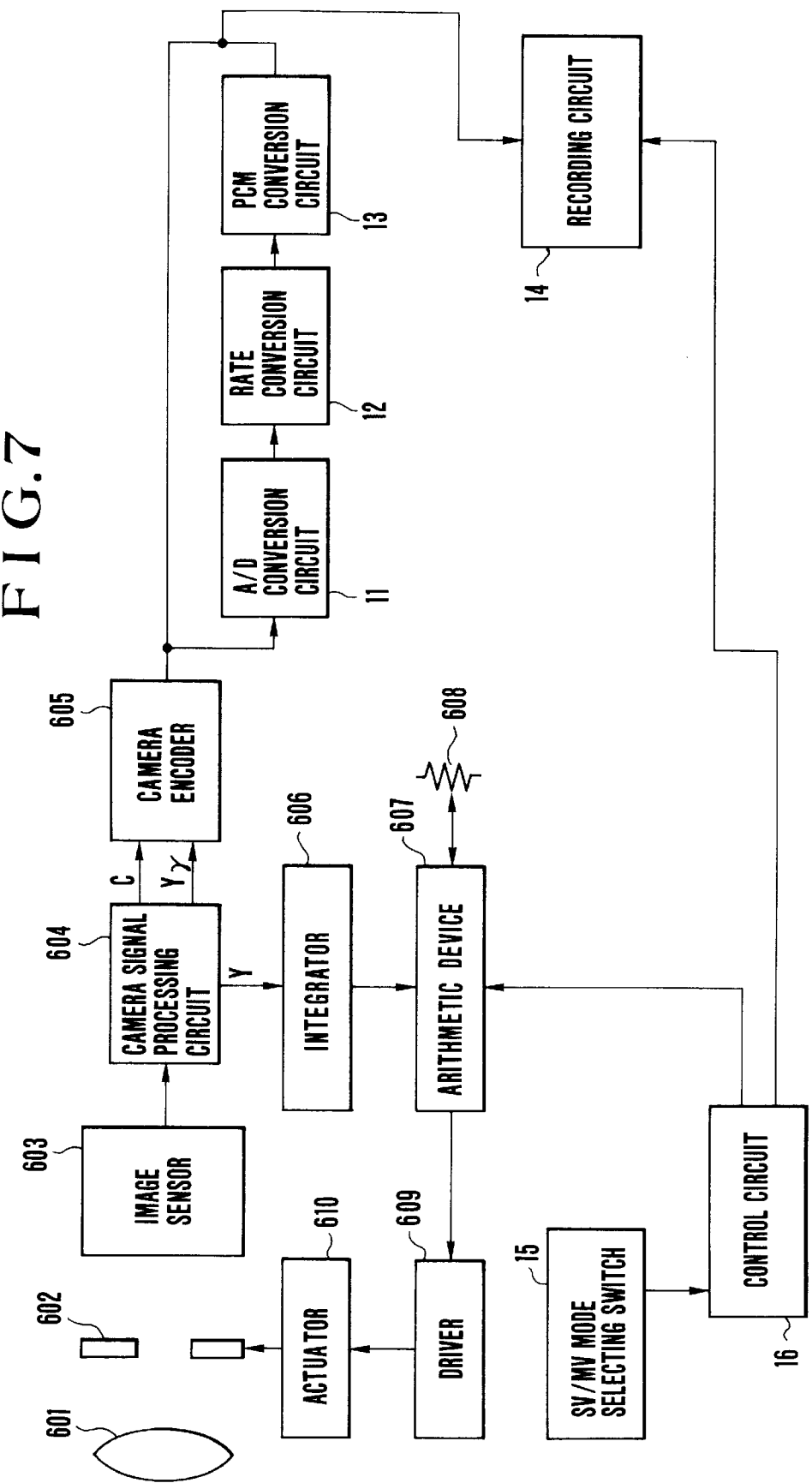
FIG. 7 is a schematic block diagram showing a first embodiment of the present invention.

FIG. 7 shows a first embodiment of the present invention.

Figure 1:
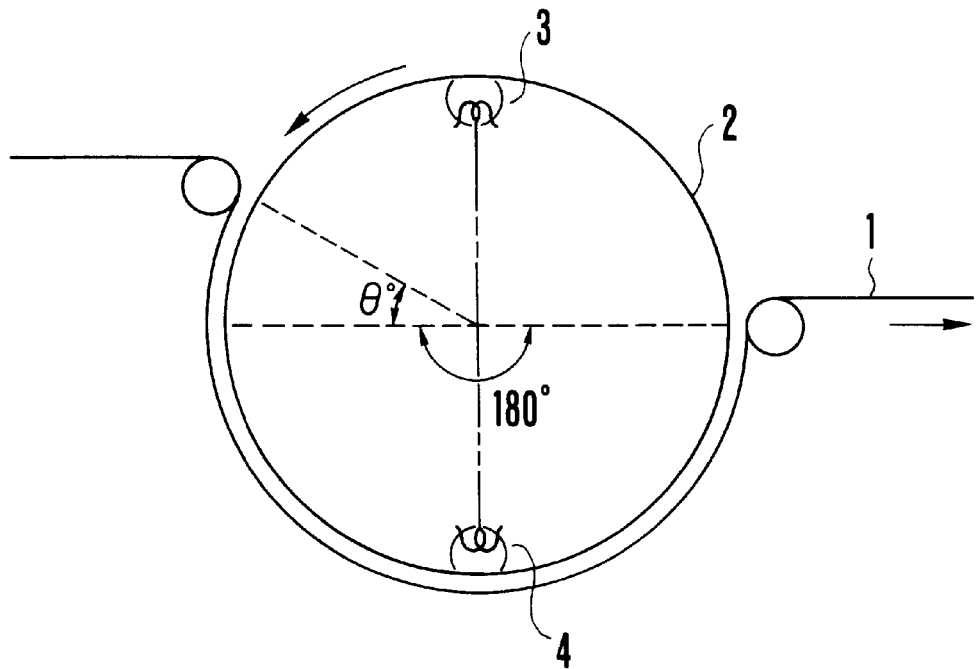
FIG. 1 is a schematic view showing a magnetic-tape transport system in a VTR for recording or reproducing a video signal and an audio signal.
Figure 2:
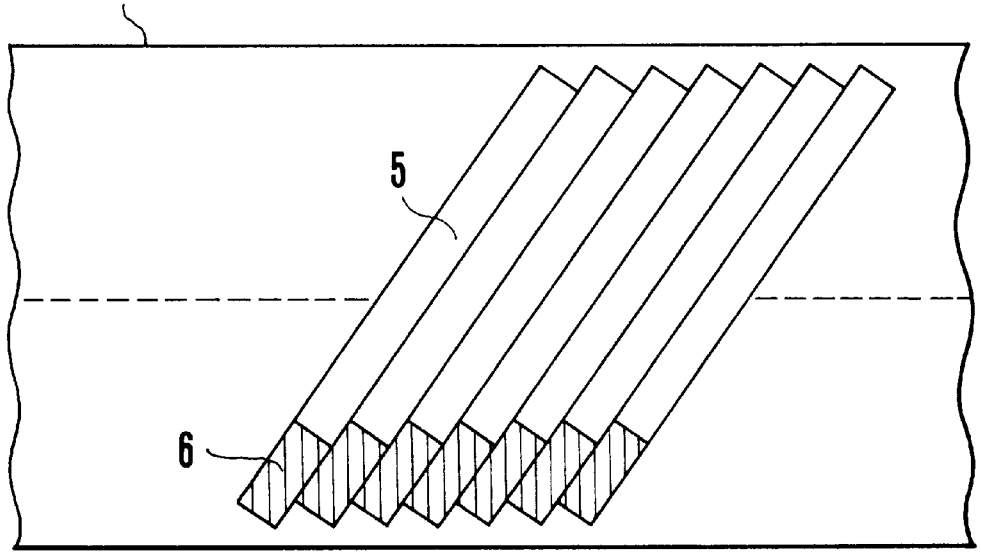
FIG. 2 is a schematic view showing recording tracks formed on a magnetic tape by the head shown in FIG. 1.
Figure 3:
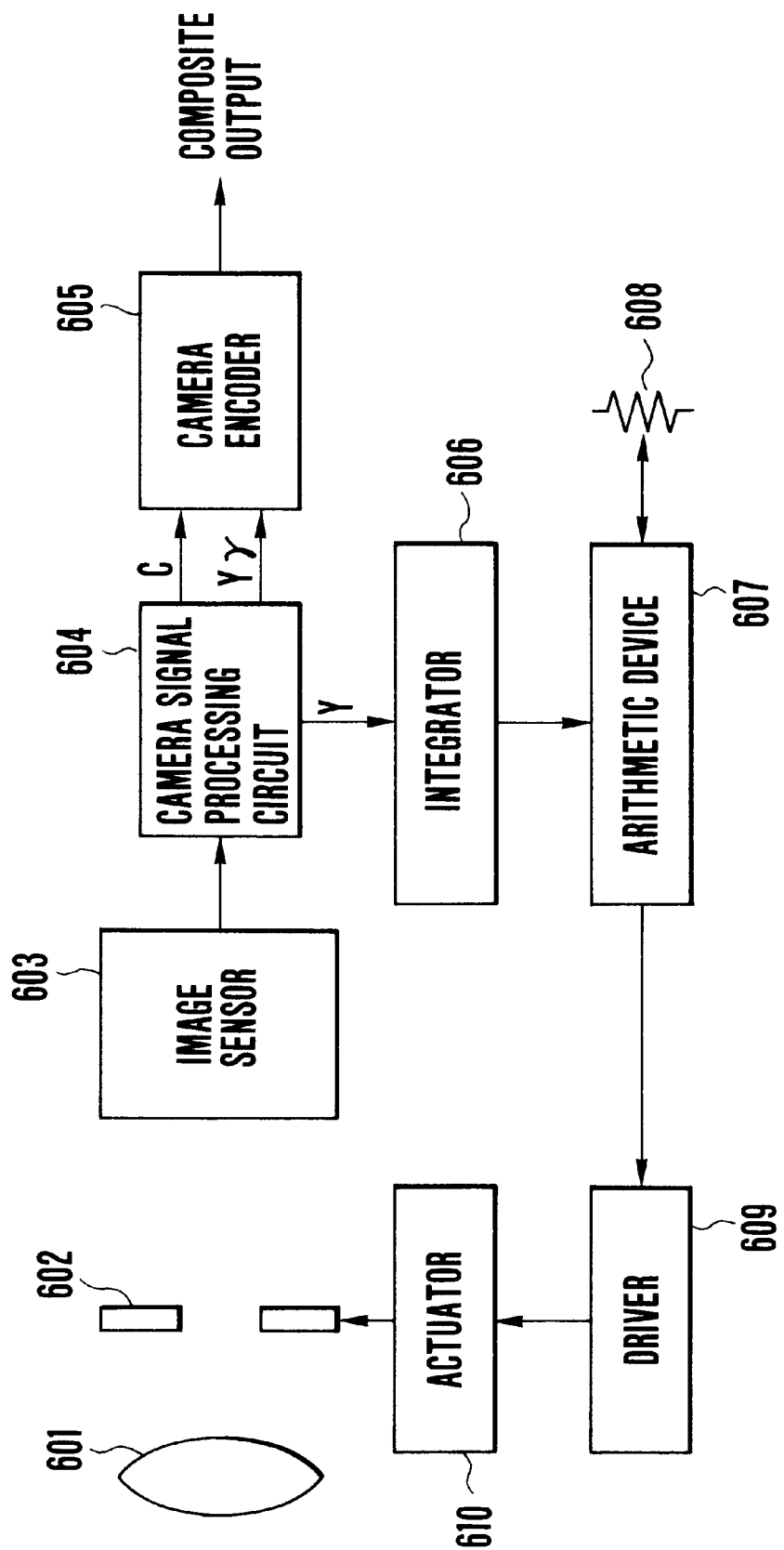
FIG. 3 is a schematic block diagram showing one example of an automatic exposure control device for a conventional camera for motion-image photography.

The arrangement shown in FIG. 7 includes constituent elements 601 to 610 which are substantially identical to those described above in connection with FIG. 3. The arrangement further includes an A/D conversion circuit 11 for performing A/D conversion of a signal supplied from the camera encoder 605, a rate conversion circuit 12 for allocating a digital signal supplied from the A/D conversion circuit 11 to the respective PCM areas of a plurality of tracks, a PCM conversion circuit 13 for performing PCM conversion of a signal supplied from the rate conversion circuit 12, a recording circuit 14 for selectively recording a video signal supplied from the camera encoder 605 and a still-image signal supplied from the PCM conversion circuit 13, an SV/MV mode selecting switch 15 for selecting either one of a still-image recording mode (SV mode) and a motion-image recording mode (MV mode), and a control circuit 16. If the SV mode is set through the SV/MV mode selecting switch 15, the control circuit 16 sets the gain of the arithmetic device 607 to a high level with respect to the MV mode. Further, the control circuit 16 controls the recording circuit 14 in accordance with a photographic mode set through the SV/MV mode selecting switch 15.

The operation of the arrangement shown in FIG. 7 will be described below.

If the MV mode is selected through the SV/MV mode selecting switch 15, the control circuit 16 sets the gain of the arithmetic device 607 to a level which is the same as that of the gain set in the conventional art. If the SV mode is selected, the control circuit 16 sets the gain of the arithmetic device 607 to a level which is higher than that of the gain set in the MV mode.

Light which has passed through the optical system 601 is conducted to the iris 602, and the amount of the light is adjusted by the iris 602. The light is then made incident on the image sensor 603 such as a CCD and is converted into an electrical signal by the image sensor 603. The electrical signal from the image sensor 603 is subjected to processing such as gamma correction and separated into a luminance signal and a chrominance signal, by the camera signal processing circuit 604. The luminance and chrominance signals are converted into a standardized television video signal which conforms to, for example, the NTSC system, by the camera encoder 605.

In the case of the MV mode, the video signal from the camera encoder 605 is recorded in the respective motion-image recording areas of particular video tracks by the recording circuit 14. In the case of the SV mode, the video signal from the camera encoder 605 is subjected to A/D conversion by the A/D conversion circuit 11, and the digital signal from the A/D conversion circuit 11 is subjected to conversion which is performed by the rate conversion circuit 12 for the purpose of allocating the digital signal to the respective PCM areas of a plurality of tracks. The signal from the rate conversion circuit 12 is subjected to PCM conversion by the PCM conversion circuit 13, and is then recorded in the respective still-image recording areas of particular video tracks by the recording circuit 14.

In the meantime, a luminance signal Y which has not been subjected to gamma correction in the camera signal processing circuit 604 is supplied to the integrator 606, where the luminance signal Y is subjected to integration processing. The arithmetic device 607 calculates the difference between the output of the integrator 606 and a reference value, and then supplies the resultant difference signal to the driver 609 as an exposure control signal. The driver 609 causes the actuator 610 to control the aperture size of the iris 602 on the basis of the exposure control signal, thereby keeping constant the relationship between the output of the integrator 606 and the predetermined reference value.

Figure 8:
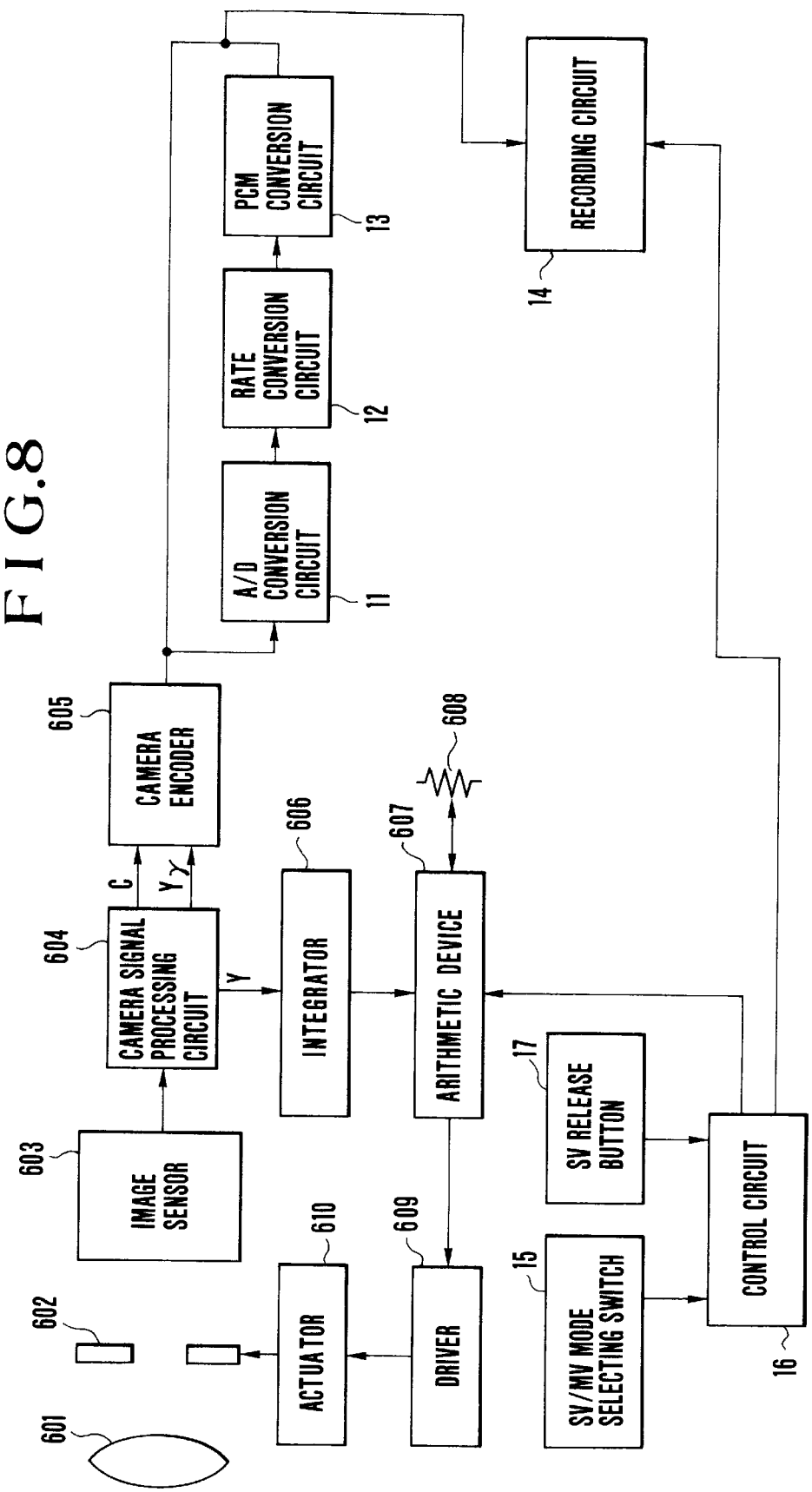
FIG. 8 is a schematic block diagram showing a second embodiment of the present invention.
Figure 9:
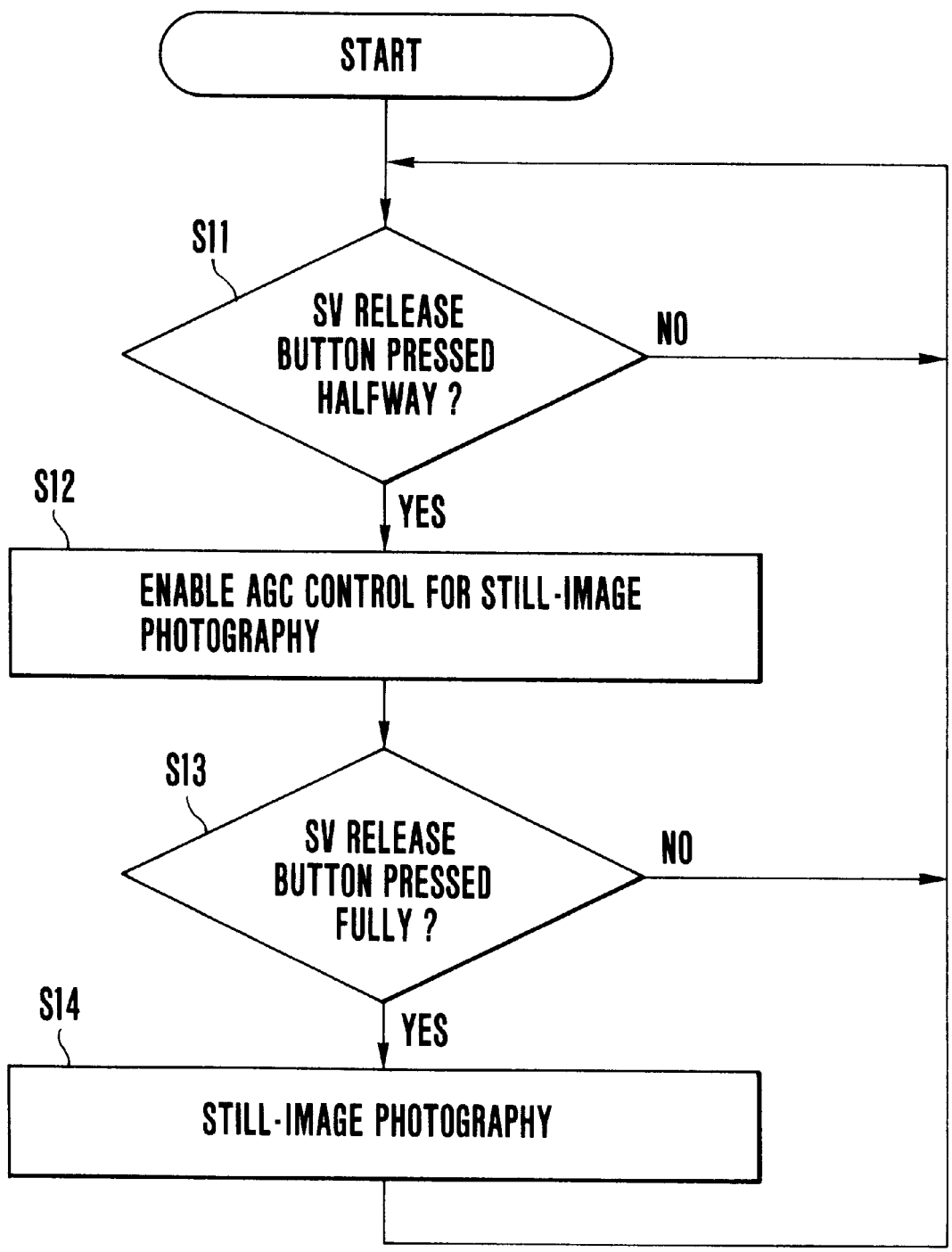
FIG. 9 is a flowchart showing a control procedure followed by a control circuit 16 in the second embodiment.

FIG. 8 shows a second embodiment of the present invention. The arrangement shown in FIG. 8 is provided with an SV release button 17 in addition to the constituent elements of the first embodiment. A control procedure which is followed by the control circuit 16 is shown in FIG. 9.

If it is determined in Step S11 that the SV release button 17 has been pressed halfway, the process proceeds to Step S12, where a high-speed exposure correcting operation for still-image photography is enabled. If it is determined in Step S13 that the SV release button 17 has been fully pressed, the video signal is subjected to A/D conversion, rate conversion and PCM conversion in that order. The thus-obtained still image is recorded in Step S14.

Figure 10:
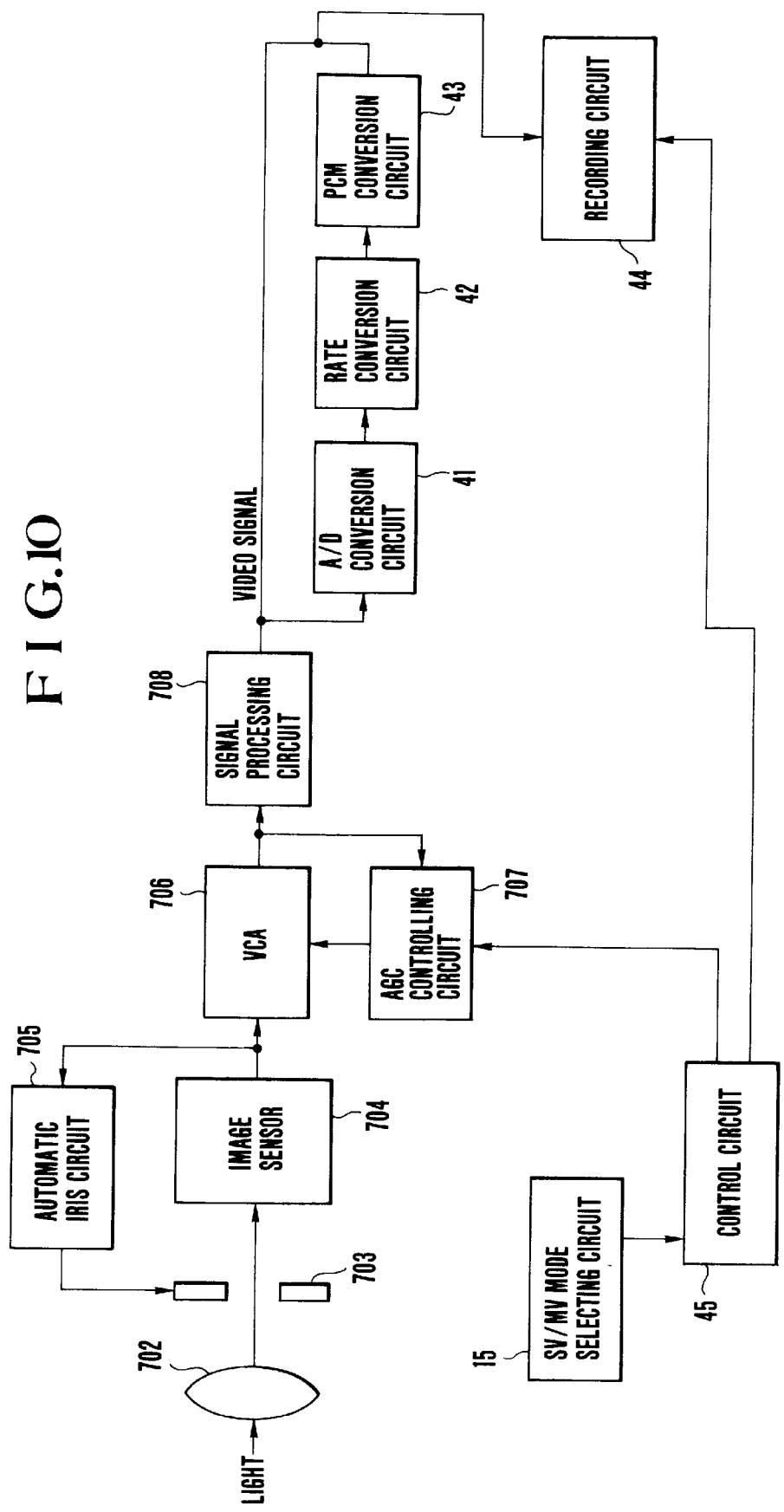
FIG. 10 is a schematic block diagram showing a third embodiment of the present invention.

FIG. 10 shows a third embodiment of the present invention.

Figure 4:
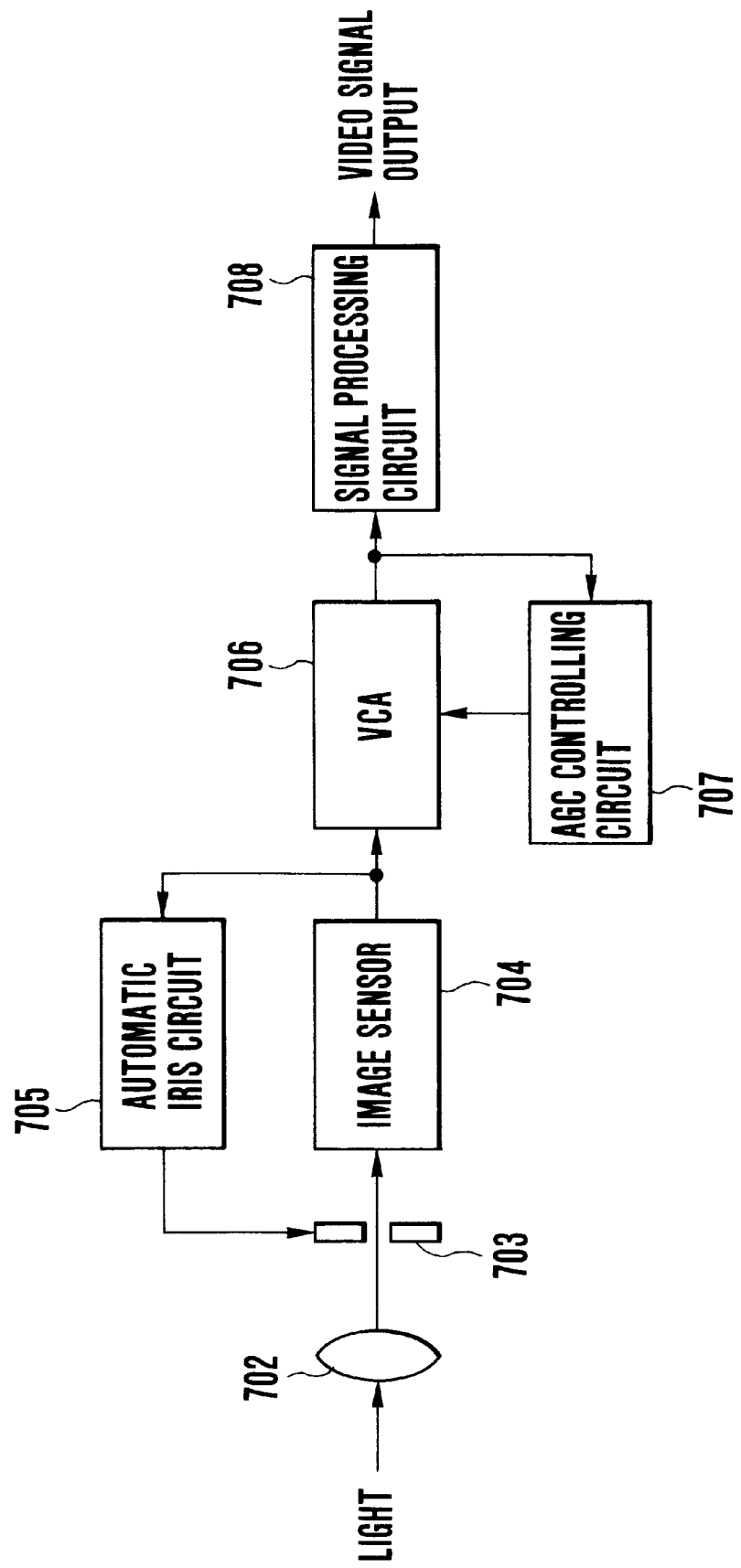
FIG. 4 is a schematic block diagram showing another example of the automatic exposure control device for the conventional camera for motion-image photography.

The arrangement shown in FIG. 10 includes constituent elements 702 to 708 which are substantially identical to those described above in connection with FIG. 4. The arrangement further includes an A/D conversion circuit 41 for performing A/D conversion of a signal supplied from the signal processing circuit 708, a rate conversion circuit 42 for allocating a digital signal supplied from the A/D conversion circuit 41 to the respective PCM areas of a plurality of tracks, a PCM conversion circuit 43 for performing PCM conversion of a signal supplied from the rate conversion circuit 42, a recording circuit 44 for recording a video signal supplied from the signal processing circuit 708 and a still-image signal supplied from the PCM conversion circuit 43, and a control circuit 45. The control circuit 45 causes the AGC control circuit 707 to control the gain of the AGC circuit of the VCA 706, in accordance with a photographic mode which is set through the SV/MV mode selecting switch 15. Further, the control circuit 45 controls the recording circuit 44 in accordance with the photographic mode set through the SV/MV mode selecting switch 15.

The operation of the arrangement shown in FIG. 10 will be described below.

If the MV mode is selected through the SV/MV mode selecting switch 15, the gain of the AGC circuit of the VCA 706 is set to a level which is the same as that of the gain set in the conventional art. If the SV mode is selected, the gain of the AGC circuit of the VCA 706 is set to a level which is higher than that of the gain set in the MV mode.

Light from a subject passes through the optical system 702 and the iris 703 and is made incident on the image sensor 704, where the incident light is converted into an electrical signal. The electrical signal from the image sensor 704 is supplied to the voltage-controlled amplifier (VCA) 706, where the level of the electrical signal is controlled. The AGC circuit which is a constituent element of the VCA 706 is controlled by the AGC control circuit 707 in accordance with the output of the VCA 706. The signal processing circuit 708 separates the output signal of the VCA 706 into a chrominance signal and a luminance signal and performs predetermined processing to output a standard video signal (according to the NTSC or PAL system).

In the case of the MV mode, the standard video signal from the signal processing circuit 708 is recorded in the respective motion-image recording areas of particular video tracks by the recording circuit 44. In the case of the SV mode, the video signal from the signal processing circuit 708 is subjected to A/D conversion by the A/D conversion circuit 41, and the digital signal from the A/D conversion circuit 41 is subjected to conversion which is performed by the rate conversion circuit 12 for the purpose of allocating the digital signal to the respective PCM areas of a plurality of tracks. The signal from the rate conversion circuit 42 is subjected to PCM conversion by the PCM conversion circuit 43, and is then recorded in the respective still-image recording areas of particular video tracks by the recording circuit 44.

If the photographic mode selected through the SV/MV mode selecting switch 15 is the MV mode, the gain of the AGC circuit which is associated with exposure correction is set to a low level, so that the AGC circuit provides an output so as to vary the amount of exposure on a step-by-step basis until the amount of correct exposure is reached. Accordingly, a smooth exposure correction operation can be performed.

If the photographic mode selected through the SV/MV mode selecting switch 15 is the SV mode, the gain of the AGC circuit which is associated with exposure correction is set to a high level, so that the AGC circuit provides an output so as to vary instantaneously the amount of exposure to the amount of correct exposure. Accordingly, a high-speed exposure correction operation is achieved.

Figure 11:
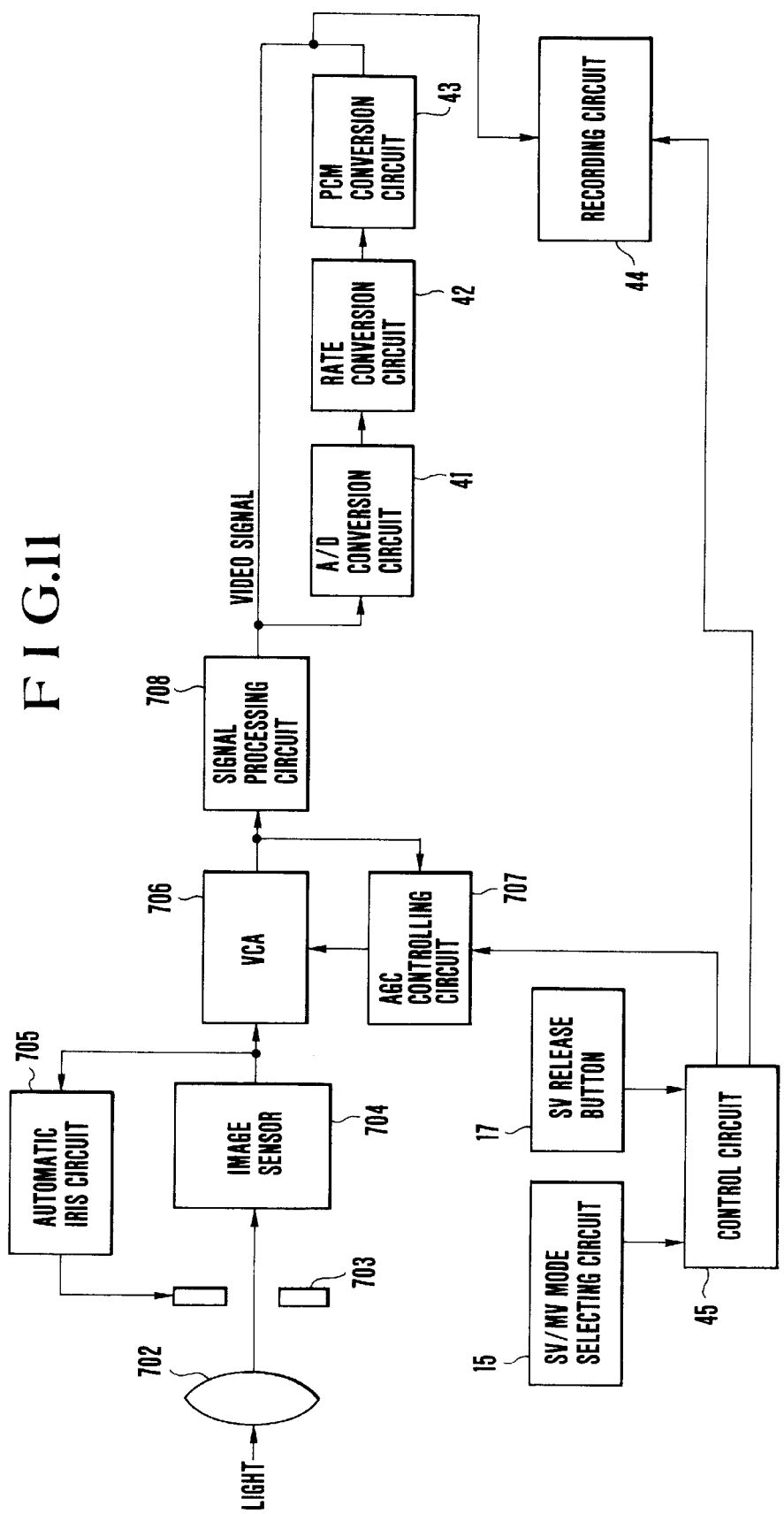
FIG. 11 is a schematic block diagram showing a fourth embodiment of the present invention.

FIG. 11 shows a fourth embodiment of the present invention. The arrangement shown in FIG. 11 is provided with the SV release button 17 in addition to the constituent elements of the third embodiment. A control procedure which is followed by the control circuit 45 is essentially the same as that shown in FIG. 9, and the description thereof is omitted.

As is apparent from the above description, in accordance with any of the first to fourth embodiments which are respectively arranged in the above-described manners, it is possible to achieve the advantage that optimum exposure control can be performed.

A fifth embodiment of the present invention will be described below.

Figure 5:
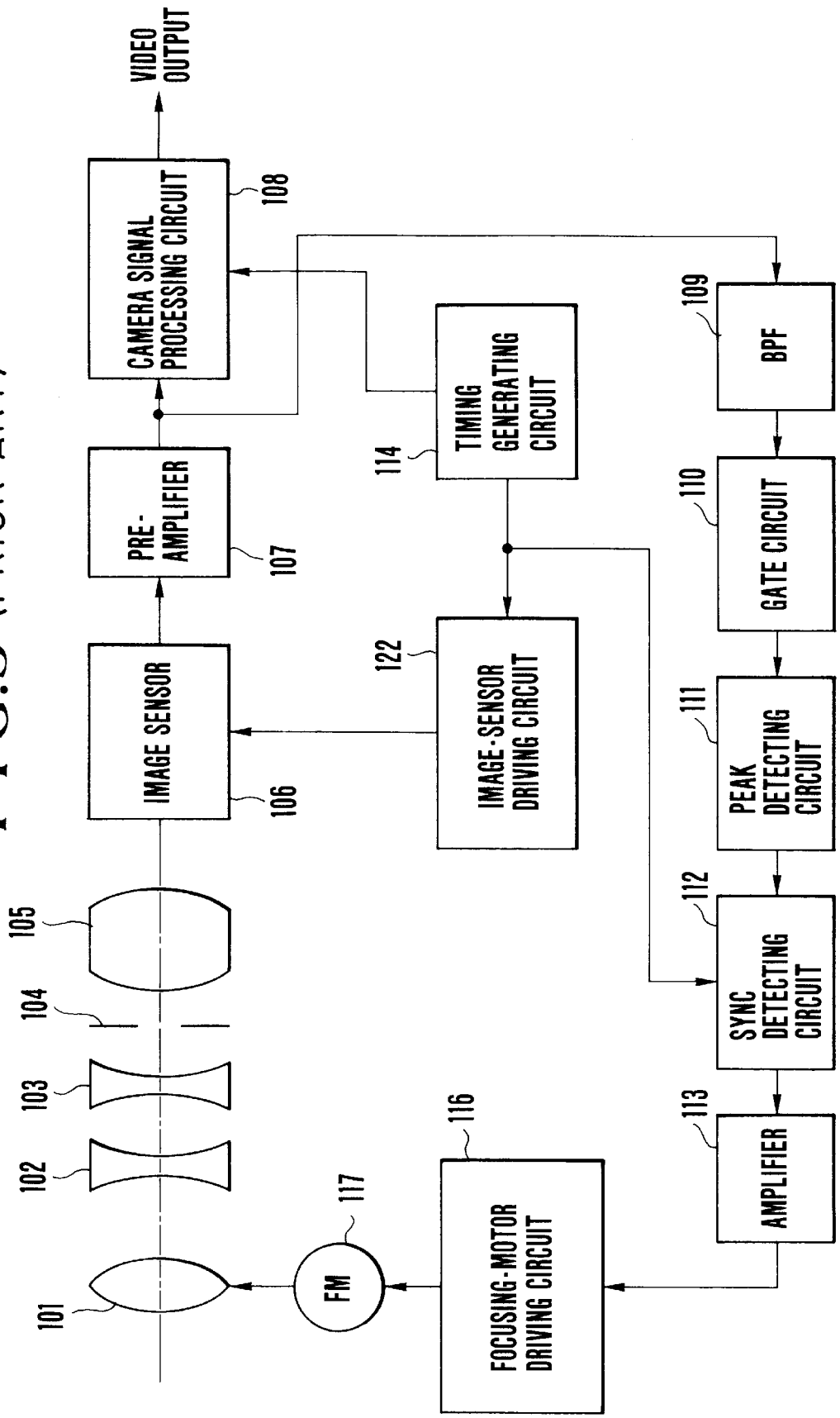
FIG. 5 is a schematic block diagram showing the construction of a motion-image photographic apparatus.
Figure 12:
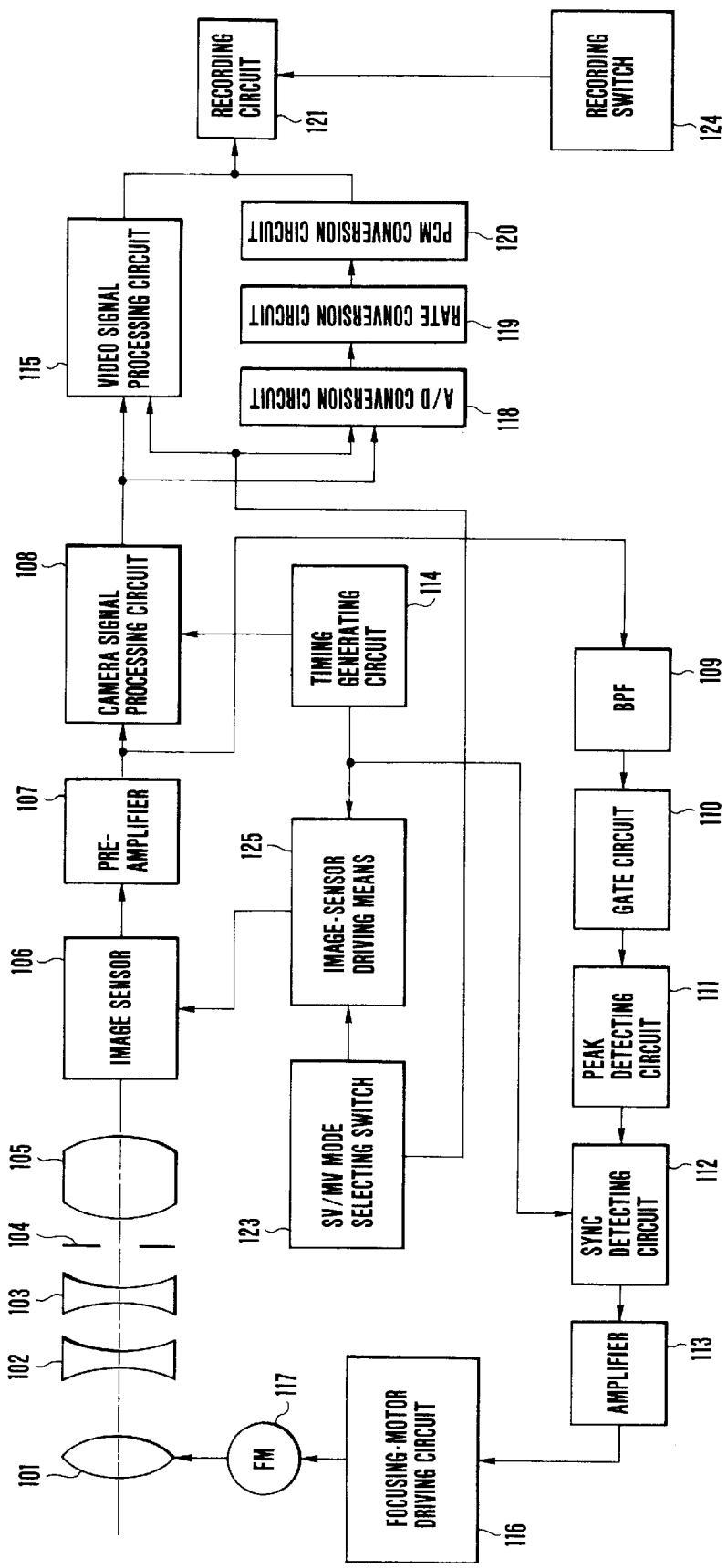
FIG. 12 is a schematic block diagram showing a fifth embodiment of the present invention.

The arrangement shown in FIG. 12 includes constituent elements 101 to 114, 116 and 117 which are substantially identical to those described above in connection with FIG. 5. The arrangement further includes a video signal processing circuit 115 for processing a standard video signal supplied from the camera signal processing circuit 108 to form a motion-image signal.

The still-image signal forming circuit of the shown arrangement consists of an A/D conversion circuit 118, a rate conversion circuit 119 and a PCM conversion circuit 120. The A/D conversion circuit 118 converts into a digital signal a standard television signal supplied from the camera signal processing circuit 108. The rate conversion circuit 119 performs conversion for allocating the digital signal to the respective PCM areas of a plurality of tracks. The PCM conversion circuit 120 performs PCM conversion of the signal supplied from the rate conversion circuit 119.

The shown arrangement further includes a recording circuit 121 for recording a still image or a motion image, an SV/MV mode selecting switch 123 for switching each of the video signal processing circuit 115 and the A/D conversion circuit 118 between the SV mode (still-image recording mode) and the MV mode (motion-image recording mode), a recording switch 124 for switching the recording circuit 121 between the SV mode and the MV mode, and image-sensor driving means 125 using a piezoelectric element. The image-sensor driving means 125 varies the frequency at which the image sensor 106 wobbles along the optical axis, in accordance with a mode selected by the SV/MV mode selecting switch 123, thereby causing the image sensor 106 to wobble toward a near-focus side or a far-focus side for the purpose of optical-path modulation.

Figure 13:
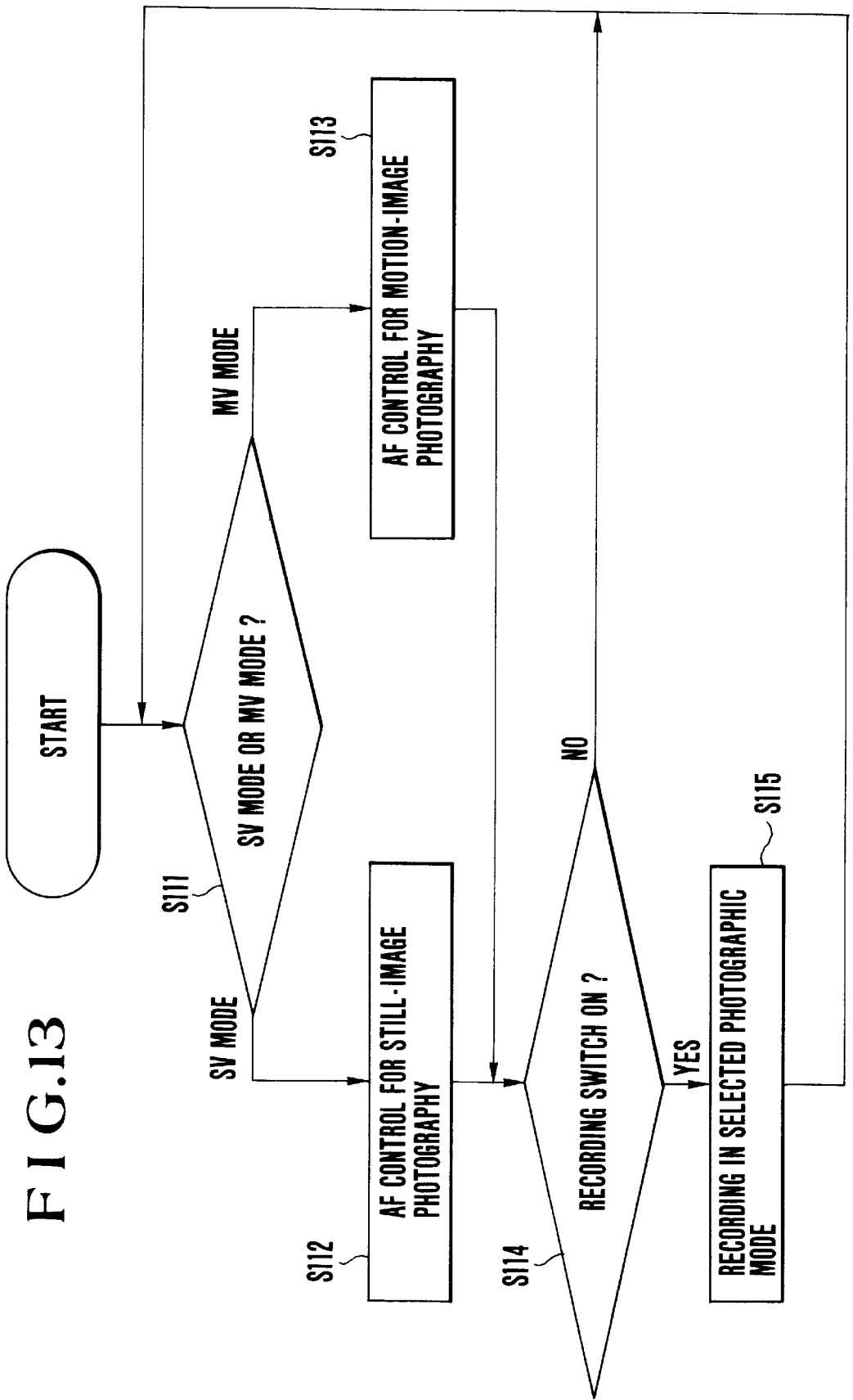
FIG. 13 is a flowchart showing a control procedure followed by the image-sensor driving means shown in FIG. 12.
Figure 14:
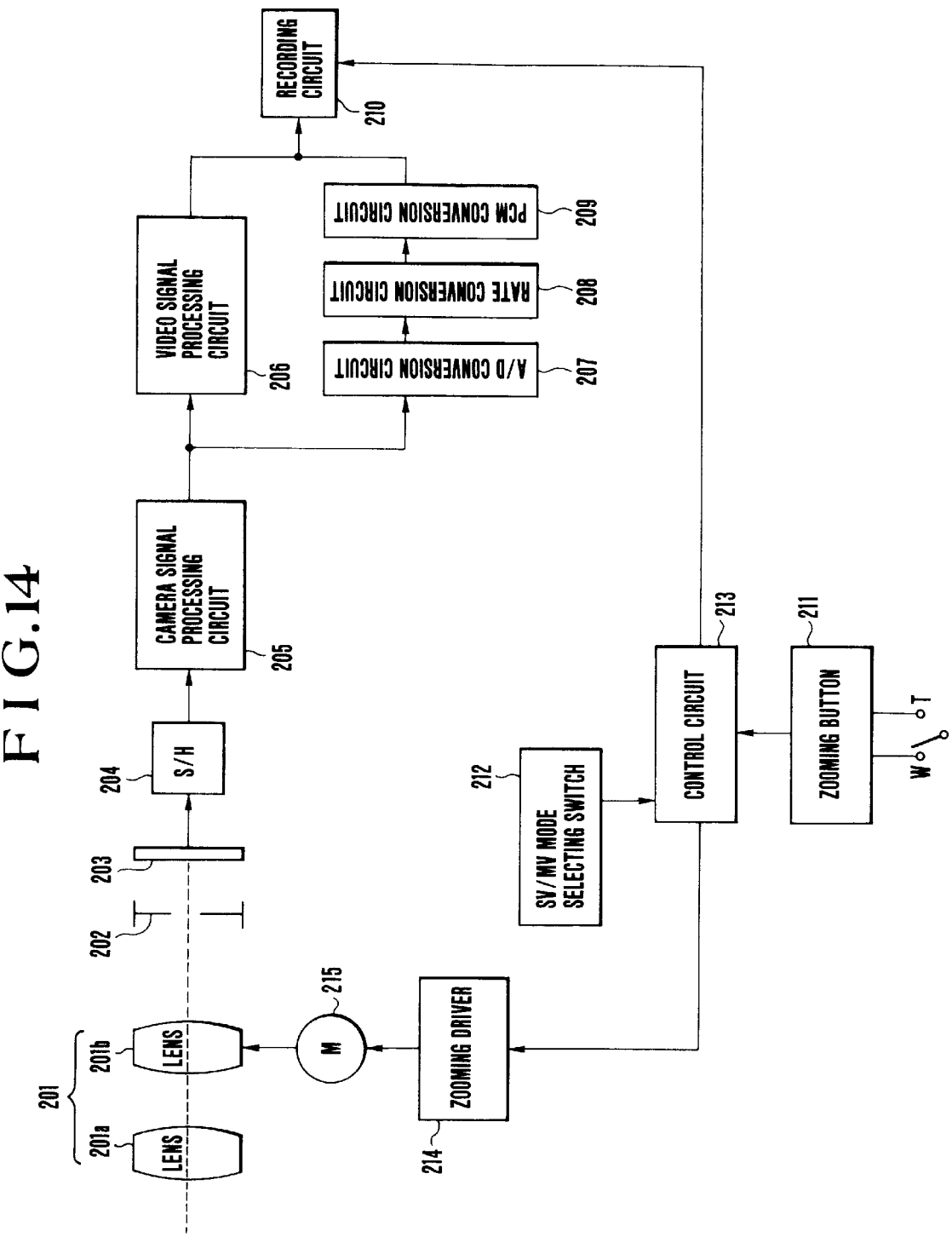
FIG. 14 is a schematic block diagram showing a sixth embodiment of the present invention.

FIG. 13 is a flowchart showing a control procedure which is followed by the image-sensor driving means 125.

In Step S111, it is determined whether the photographic mode is the SV mode or the MV mode. If the result is the SV mode, the process proceeds to Step S112, where AF control for still-image photography, which is based on a closed loop having a high loop gain, is executed. In Step S114, it is determined whether the recording switch 124 is on or off. If it is determined that the recording switch 124 is not on, the process returns to Step S111. If it is determined that the recording switch 124 is on, still-image photography is performed in Step S115.

If it is determined in Step S111 that the MV mode has been selected, the process proceeds to Step S113, where AF control for motion-image photography is performed.

Then, in Step S114, it is determined whether the recording switch 124 is on. If it is determined that the recording switch 124 is not on, the process returns to Step S111. If it is determined that the recording switch 124 is on, motion-image photography is performed in Step S115.

If the amount of wobbling of the image sensor 106, that is, the signal amplitude thereof, is increased in the SV mode, the amplitude of an optical-path modulation signal component in a sensed-image signal outputted from the image sensor 106 becomes large. Accordingly, the closed-loop gain of a focus control system is increased which consists of the image sensor 106, a signal processing system such as a band-pass filter or a sync detecting circuit 112 for extracting the optical-path modulation signal component from the sensed-image signal, an amplifier 113, a focusing-motor driving circuit 116 and a focusing motor 117. By increasing the closed-loop gain of such a focus control system, detection sensitivity relative to the amount of defocus is increased and hence the output level of the sync detecting circuit 112 is increased. In consequence, the focusing motor 117 is driven at a speed higher than its normal driving speed so that a high-speed AF operation can be performed. In addition, the detection sensitivity relative to the amount of defocus is increased and hence the accuracy of detection of a fine focus position in the neighborhood of an in-focus position is improved. Accordingly, high-speed and high-precision AF control suitable for still-image photography can be achieved.

In the above-described case, a signal indicative of the SV mode is outputted from the SV/MV mode selecting switch 123, and a standard television signal is subjected to predetermined conversion processing in each of the A/D conversion circuit 118, the rate conversion circuit 119 and the PCM conversion circuit 120. The resultant signal is inputted to the recording circuit 121, and the still image is recorded by the recording circuit 121 in accordance with the output of the recording switch 124.

If the mode selected through the SV/MV mode selecting switch 123 is the MV mode, the signal from the camera signal processing circuit 108 is processed by the video signal processing circuit 115. The signal from the video signal processing circuit 115 is inputted to the recording circuit 121, and the motion image is recorded by the recording circuit 121 in accordance with the output of the recording switch 124.

The above-described method of detecting a high-frequency component from a video signal to drive a focusing lens toward an in-focus point may be implemented not only by utilizing the wobbling of the image sensor but also by causing the focusing lens or a magnification varying lens to wobble along the optical axis. Accordingly, the method utilizing only the wobbling of the image sensor is not construed as limiting the scope of the present invention. To the contrary, the present invention is intended to encompass other similar methods such as the method of causing the focusing lens or the magnification varying lens to wobble along the optical axis.

As is apparent from the above description, in accordance with the fifth embodiment which is arranged in the above-described manner, it is possible to achieve the advantage that AF control for motion-image photography can be optimumly performed and also the advantage that AF control for still-image photography can be optimumly performed at a higher speed.

A sixth embodiment of the present invention will be described below.

Figures 6A, 6B:
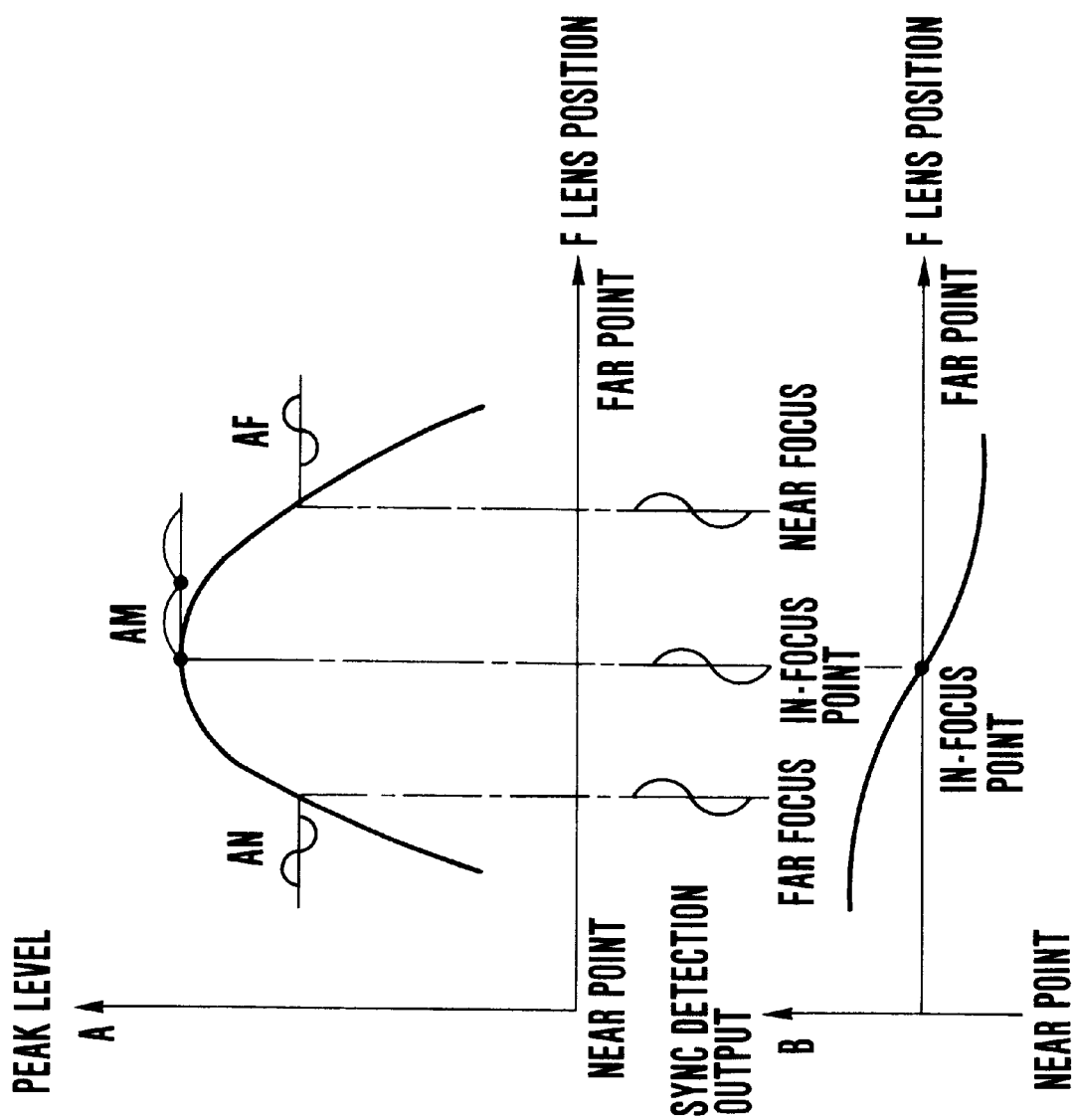
FIGS. 6(a) and 6(b) are explanatory views which serve to illustrate an automatic focus adjusting method adopted in the motion-image photographic apparatus shown in FIG. 5.

The arrangement shown in FIG. 6 includes a photographic lens system 201 provided with a focusing lens 201a for focus adjustment and a zooming lens 201b for magnification variation, an iris 202 for controlling the amount of light passed through the photographic lens system 201, a solid-state image sensor 203 for photoelectrically converting a subject image formed in its image sensing plane to a sensed-image signal, a sample-and-hold circuit (S/H) 204 for sampling and holding a signal from the solid-state image sensor 203, and a camera signal processing circuit 205 for converting a signal supplied from the S/H 204 into a predetermined television signal.

The shown arrangement also includes a video signal processing circuit 206 for processing a video signal supplied from the camera signal processing circuit 205, an A/D conversion circuit 207 for performing A/D conversion of a signal supplied from the camera signal processing circuit 205, a rate conversion circuit 208 for performing conversion for allocating a digital signal supplied from the A/D conversion circuit 207 to the respective PCM areas of a plurality of tracks, a PCM conversion circuit 209 for performing PCM conversion of a signal supplied from the rate conversion circuit 208, and a recording circuit 210 for selectively recording a video signal supplied from the video signal processing circuit 206 and a still-image signal supplied from the PCM conversion circuit 209.

The shown arrangement also includes a zooming button 211 for selecting either one of zooming toward a telephoto side (T) and zooming toward a wide-angle side (W), an SV/MV mode selecting switch 212 for selecting either one of the still-image recording mode (SV mode) and the motion-image recording mode (MV mode), a motor 215 such as a stepping motor for driving the zooming lens 201b, a zooming driver 214 for driving the motor 215, and a control circuit 213. In the case of the SV mode, the control circuit 213 causes the zooming driver 214 to control the motor 215 so that it runs at a high speed, in accordance with a selection output from the zooming button 211. In the case of the MV mode, the control circuit 213 causes the zooming driver 214 to control the motor 215 so that it runs smoothly, in accordance with the selection output.

The operation of the sixth embodiment will be described below.

If the control circuit 213 detects that the photographic mode is the SV mode or the MV mode, a still image is recorded in the respective still-image recording areas in particular video tracks or a motion image in the respective motion-image recording areas in the particular video tracks, by the recording circuit 210 in accordance with the detected photographic mode. The motor 215 is driven by the zooming driver 214 in accordance with the output of the zooming button 211 which indicates whether zooming toward the telephoto side or zooming toward the wide-angle side has been selected, so that the lens 201b is actuated to effect a magnification varying operation conforming to the selection output of the zooming button 211. Further, the gain of the associated circuit is controlled by the control circuit 213 in accordance with the selected photographic mode. If the SV mode is selected, the gain is increased with respect to the output of the zooming button 211, whereas if the MV mode is selected, the gain is decreased with respect to that of the zooming button 211. Accordingly, in the case of the SV mode, the motor 215 is driven to run at a high speed so that a high-speed magnification varying operation is performed. In the case of the MV mode, the motor 215 is driven to run smoothly so that a smooth magnification varying operation is performed.

Figure 15:
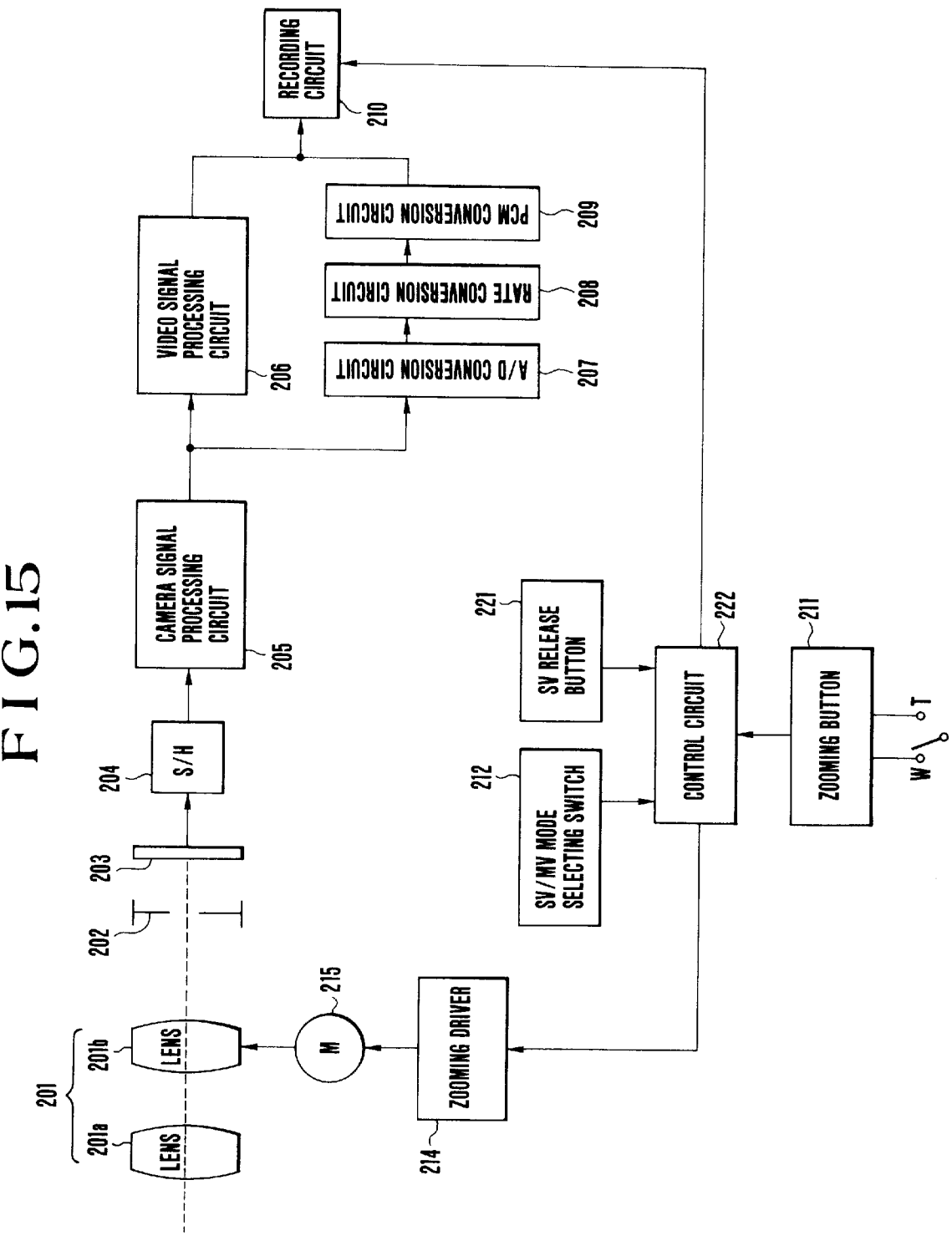
FIG. 15 is a schematic block diagram showing a seventh embodiment of the present invention.
Figure 16:
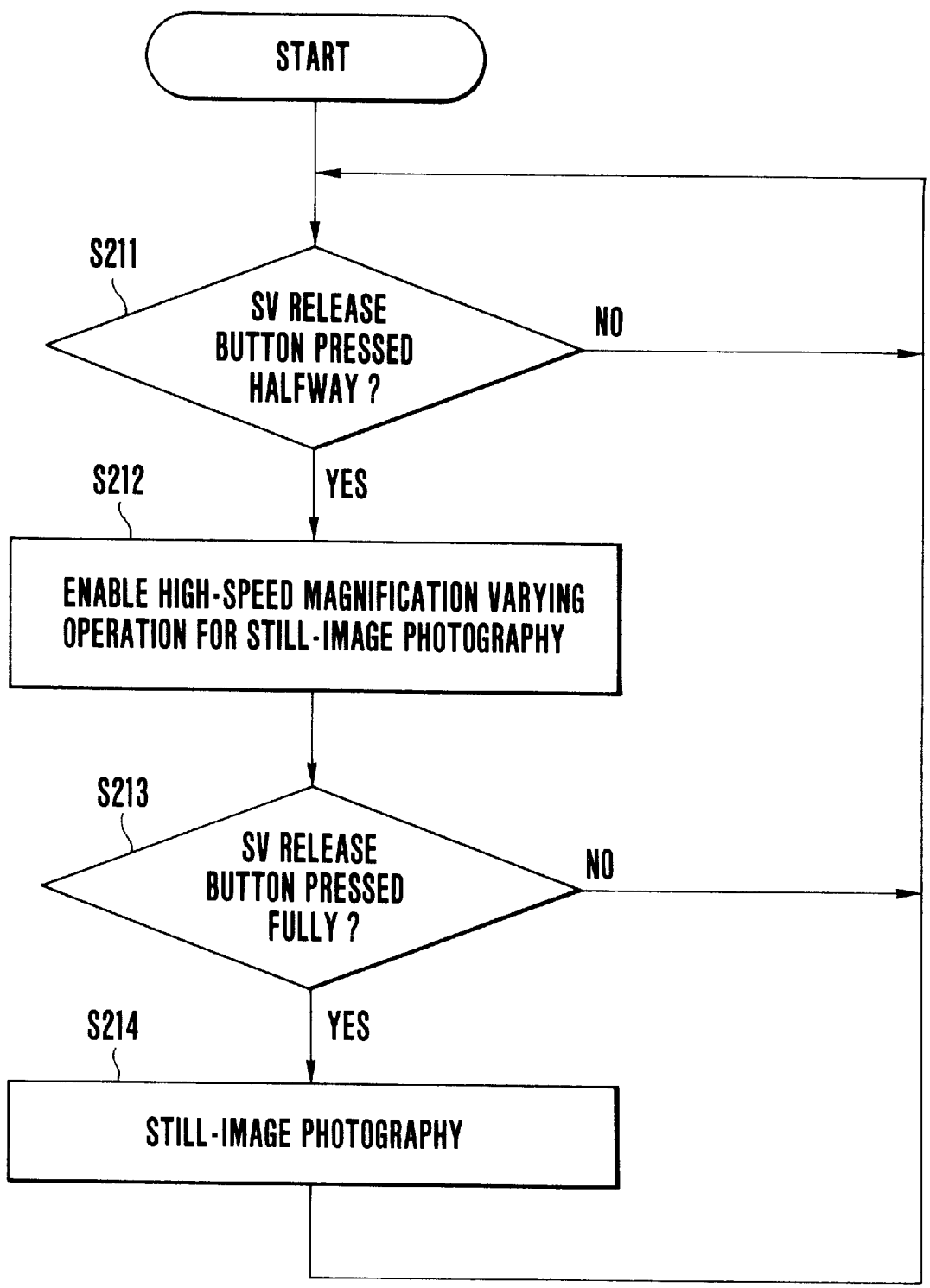
FIG. 16 is a flowchart showing the operation of the seventh embodiment.

FIG. 15 shows a seventh embodiment of the present invention. The arrangement shown in FIG. 15 is provided with an SV release button 221 in addition to the constituent elements of the sixth embodiment. FIG. 16 is a flowchart showing a control procedure which is followed by the control circuit 222.

Referring to the flowchart of FIG. 16, if it is determined in Step S211 that the SV release button 221 has been pressed halfway, the process proceeds to Step S212, where a magnification varying operation for still-image photography is enabled. If it is determined in Step S213 that the SV release button 221 has been fully pressed, the obtained still image is recorded in Step S214.

If the SV release button 221 is released and the selection of a still-image photographic mode is detected by the control circuit 222, a magnification varying operation during the release operation is performed at a high speed by the control circuit 222.

As is apparent from the above description, in accordance with each of the sixth and seventh embodiments which are respectively arranged in the above-described manners, it is possible to optimumly perform a magnification varying operation and adjustment of a focal length during either motion-image photography or still-image photography.

What is claimed is:

1. An image sensing apparatus comprising:

(a) image sensing means for photoelectrically converting an image light incident from a subject;

(b) gain control means for controlling a signal gain of an output of said image sensing means;

(c) mode specifying means for selectively specifying a still-image photographic mode and a motion-image photographic mode; and (d) speed control means for increasing gain control speed of said gain control means when said still-image photographic mode is specified by said mode specifying means.

2. An image sensing apparatus according to claim 1, wherein said image sensing means includes a charge-coupled device.

3. An image sensing apparatus according to claim 1, wherein the control characteristic includes an amplification degree.

4. An image sensing apparatus, comprising:

(a) image sensing means for obtaining an image signal;

(b) gain control means for controlling a signal gain of an output of said image sensing means;

(c) signal processing means for performing signal processing to an output signal of the gain control means;

(d) mode specifying means for specifying a still-image photographic mode and a motion-image photographic mode; and (e) speed control means for increasing gain control speed of said gain control means when said still-image photographic mode is specified by said mode specifying means.

5. An apparatus according to claim 4, wherein said image sensing means includes a charge-coupled device.

6. An apparatus according to claim 4, wherein the signal processing means includes means for forming a motion-image signal and a still-image signal from the output of the gain control means, and wherein recording means records the still-image signal in a still-image recording area of a video track formed obliquely with respect to a longitudinal axis of a magnetic tape, and records the motion-image signal in a motion-image recording area of the video track, the still-image recording area and the motion-image recording area being formed adjacent to each other on a single video track.

\* \* \* \* \*